United States Patent Office 3,198,842
Patented Aug. 3, 1965

3,198,842
ALLYLATION OF PHENOL
Paul J. Berrigan, Niagara Falls, N.Y., assignor to Shell Oil Company, New York, N.Y., a corporation of Delaware
No Drawing. Filed Apr. 18, 1962, Ser. No. 189,243
7 Claims. (Cl. 260—624)

This invention relates to a process for the selective allylation of phenol. More particularly, the invention relates to a process for the direct introduction of allyl groups on the ring of hydroxybenzene compounds such as phenol.

The reaction of an allyl halide, such as allyl chloride, and a hydroxybenzene compound, such as phenol, is capable of yielding allyl phenyl ether or allyl phenol. Claisen's procedures involve conducting the reaction in polar solvents, such as tetrahydrofurane, ethanol, and the like, for production of ethers, and in non-polar solvents, such as benzene or paraffins, for production of allyl phenols. In practice, the preparation of the ethers proceeds cleanly and quantitatively, but the preparation of allyl phenols is always contaminated with ether by-products.

It is an object of the present invention to provide a process for preparing pure allylated phenols in high yield. Another object of the invention is the provision of a novel heterogeneous process for reacting allyl halides with salts of hydroxybenzenes, to provide allylated phenols. Still another object is the provision of a process for preparing allylated phenols free of allyl phenyl ether impurities. Other objects will be apparent from the following detailed description of the invention.

These objects are accomplished by percolating beta,gamma-alkenyl halide in an inert non-polar solvent through solid alkali metal phenoxide having a replaceable hydrogen atom on at least one of the ring carbon atoms ortho to the hydroxyl group to produce a beta,gamma-alkenyl phenol.

By beta,gamma-alkenyl halides are meant those hydrocarbon halides whose sole non-aromatic unsaturation is an olefinic double bond between the carbon atoms beta and gamma to the halogen atom. These compounds are generally termed allylic halides. Such halides are those having the general structure

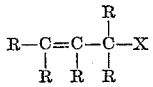

where R is a monovalent radical selected from the group consisting of the hydrogen atom, alkyl and aryl, and X is halogen. Exemplary of such compounds are crotyl chloride, crotyl bromide, methallyl chloride, ethallyl chloride, methallyl bromide, cinnamyl chloride, cinnamyl bromide, alpha,gamma-dimethallyl bromide, gamma,gamma-dimethylallyl chloride, and the like. Preferred compounds are those having up to ten carbon atoms, while particularly preferred compounds are the allyl halides wherein each R is hydrogen. Of these, allyl chloride is the most preferred embodiment.

These compounds are reacted in liquid phase in a substantially anhydrous non-polar solvent. By substantially anhydrous is meant a solvent containing no more than about 5% wt. water. Exemplary non-polar solvents are such aromatic hydrocarbon solvents as benzene, toluene, the xylenes, ethyl benzene, t-butyl benzene, and the like. Representative paraffinic non-polar solvents include pentane, hexane, cyclohexane, heptane, octane, nonane, decane, and the like. Preferred non-polar solvents are those hydrocarbons having from five to ten carbon atoms and which are free from non-aromatic unsaturation. The solvents of the process are those in which the alkali metal phenoxide reactant is insoluble and in which the alkylated phenol product is soluble.

The allyl halides of the process are employed in solution in the non-polar solvents described. While concentrations of the halides ranging from very dilute to very concentrated are operable, convenient concentrations are those from about 5% wt. to about 10% wt. of the halide, based on the solvent. The concentrations, however, may vary over a wide range, depending on the nature of the halide and the solvent, as will be understood by one skilled in the art.

In general, when allylic halides are brought in contact in liquid phase with phenols in non-polar solvents, the reaction products consist of a mixture of compounds resulting from both O-allylation, wherein the products are allylic phenyl ethers, and C-allylation, wherein the products are allylic phenols. For example, the reaction of p-cresol in benzene with sodium and allyl bromide gives the following products:

| Compound: | Percent |
|---|---|
| Allyl 4-methylphenyl ether | 20 |
| Allyl 2-allyl-4-methylphenyl ether | 8 |
| 2-allyl-4-methylphenol | 40 |
| 2,6-diallyl-4-methylphenol | 15 |

See Claisen et al., Ann. 442, 210 (1925). Under such circumstances, conversions of the phenol to such products are low.

Surprisingly, however, it has been found that if the allylic halide solution is percolated over the solid alkali metal salt of a phenol having a replaceable hydrogen atom on at least one of the ring carbon atoms ortho to the hydroxyl group, higher conversions and greater yields of C-allylated phenols with corresponding less contamination by O-allylated by-products are obtained.

These superior and unexpected results are achieved by passing a solution of the allylic halide in non-polar solvent over a solid alkali metal salt of a phenol of the type described. Such metal salts are those of the structure

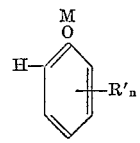

where M is an alkali metal ion, R' is a monovalent radical selected from the group consisting of hydrogen and hydrocarbyl, and n is an integer from 1 to 4, but preferably 1. Exemplary hydrocarbyl substituents are alkyl radicals, aryl and aralkyl radicals, all such radicals preferably having up to eight carbon atoms and being free of acetylenic substitution.

Representative salts of this type include sodium cresylate, potassium xylenate, lithium ethyl phenoxide, potassium p-isopropyl phenoxide, sodium o-hexyl phenoxide, potassium o-phenyl phenoxide, sodium o-allyl phenoxide, potassium p-allyl phenoxide, lithium m-crotyl phenoxide, sodium 2,4-diallyl phenoxide, potassium 3,5-diethyl phenoxide, sodium o-methallyl phenoxide, potassium p-tolyl phenoxide, and the like. Preferred phenoxides are, however, those of phenol itself, or of allyl phenols, e.g., o-allyl phenol. Such salts are readily prepared by known methods, e.g., the reaction of a phenol with an alkali metal hydroxide such as potassium hydroxide or sodium hydroxide, or of a phenol with an alkali metal hydride such as sodium hydride.

These alkali metal phenoxides are white or light-colored solids, insoluble in benzene, pentane and other non-polar hydrocarbons. As a consequence, the process of the invention is a heterogeneous process throughout the entire reaction period, the reaction between the allylic halide in the liquid phase and the solid alkali metal phenoxide taking place at the solid-liquid interface.

The process of the invention is carried out by percolating the solution of the allylic halide in the non-polar solvent over the solid alkali metal phenoxide, and recovering the resulting allylated phenol from the effluent non-polar solvent solution. The percolating may be conducted in various ways, such as by passing the solvent solution through or over a packed bed of the solid alkali metal phenoxide. The passage of the solution through the phenoxide is conducted at such a rate that the allylation of the phenoxide takes place, the rapid and continuous removal of the resulting allylic phenol product from the reaction site following the reaction. In this way, the production of allylic phenyl ethers is substantially prevented.

Since the allylation of the phenoxide takes place in stoichiometric proportions, one mole of the phenoxide will be consumed for every mole of allylic halide passed over the solid phenoxide. As a consequence, the relative proportions of halid and phenoxide employed in the process are not critical. Large molar excesses of either reactant are, however, uneconomical to employ, and the use of about one mole of allylic halide per mole of alkali metal phenoxide is preferred.

In the percolation of the allylic halide solution through the solid alkali metal phenoxide, the phenoxide may be mixed with inert solid fillers, dispersants or supports, e.g., carborundum, silica, alumina, firebrick, glass, or the like. It is, however, an outstanding and useful feature of the invention that catalysts for the promotion of the reaction are not necessary. In the event that all of the allylic halide in the solvent is not reacted in one pass over the solid phenoxide, the halide may readily be recovered and either recycled through the solid phenoxide, or passed to a second contact stage.

The temperature at which the process of the invention is conducted may be varied over a wide range. The reaction is operative at any temperature above which the allylic halide-non-polar solvent system is liquid and below which it boils. As a practical matter, however, it may be most conveniently conducted between about 0° C. and about 100° C. Since the reaction goes satisfactorily at temperatures in the neighborhood of room temperature, the preferred range is from about 20° C. to about 50° C. Although the process may readily be conducted at superatmospheric or subatmospheric pressure, there is no particular benefit in so doing, and the practice of the process of the invention at atmospheric pressure is preferred.

The allylated phenol product is readily recovered from the non-polar solvent by known methods. For example, the allylated phenol may easily be separated from the non-polar solvent effluent from the phenoxide zone by stripping the solvent and any unreacted allylic halide from the effluent mixture, and then washing the residue to remove inorganic salts therefrom. Such techniques as fractionation, extraction, fractional distillation and crystallization may also be employed.

Products of the process of the invention depend, of course, on the nature of the allylic halide and alkali metal phenoxide employed. When allyl chloride is reacted with sodium phenoxide, o-allyl phenol in high yield is obtained; while 2,6-diallyl phenol is obtained from allyl bromide and potassium o-allyl phenoxide. Similarly, crotyl iodide, when reacted with potassium phenoxide in the process of the invention, affords o-crotyl phenol; while methallyl chloride and sodium o-methallyl phenoxide yield 2,6-dimethallyl phenol. In like manner, 2,4,6-triallyl phenol is obtained from allyl bromide and potassium 2,4,-diallyl phenoxide.

It is a particularly advantageous feature of the invention that it may be used to prepare phenols having a plurality of different types of allylic substituents. For example, when crotyl chloride is reacted by the method of the invention with sodium o-allyl phenoxide, 2-allyl-6-crotyl phenol is obtained as the sole phenolic product.

The resulting allylated phenols are useful for a variety of applications. For example, they may be epoxidized to produce substituted or unsubstituted glycidyl or polyglycidyl phenols, which are in turn useful as epoxy resin diluents and intermediates.

The following examples will illustrate the novel process of the invention and the manner in which it may be conducted. It should be understood, however, that these examples are merely illustrative and are not to be regarded as limitations to the appended claims. The basic teachings of the examples may be varied at will within the scope of the disclosure, as will be understood by one skilled in the art. In the examples, the proportions are expressed in parts by weight unless otherwise noted.

*Example I*

In a Soxhlet extractor equipped with a thimble was placed 3.0 g. (0.026 mole) of solid sodium phenoxide. Over the solid was percolated slowly a solution of 8.0 g. (0.0105 mole) of allyl chloride in about 120 ml. n-pentane over a period of 5 days.

The percolated liquid was evaporated to dryness and in this way 3.3 g. of solid was obtained. Analysis of the allylated products gave the following data:

| Compound: | Percent wt. |
|---|---|
| o-Allyl phenol | 96 |
| Allyl phenyl ether | 3 |
| Allyl o-allylphenyl ether | <1 |
| Unknown | <1 |

The residual solid in the thimble was dissolved in water and diluted to 250 ml. and an aliquot thereof was titrated with 0.104 N HCl. Neutralization of 80 ml. of the sodium phenoxide solution required 1.0 ml. of the acid. On the basis of these data, it was concluded that 95–98% conversion of the phenoxide had been achieved.

*Example II*

A solution of 8.0 g. (0.105 mole) of allyl chloride in about 50 ml. of n-pentane was refluxed in contact with 3.0 g. of solid sodium phenoxide for five days. At the end of this time, the reaction system was cooled and extracted with 70 ml. of water. Upon titration of the aqueous phase, it was found that only 20% of the phenoxide had been converted to other products.

Analysis of the pentane phase gave the following data:

| Compound: | Percent wt. |
|---|---|
| Allyl phenyl ether | 15 |
| o-Allyl phenol | 82 |
| Allyl o-allylphenyl ether | 3 |

This experiment demonstrated that low conversions of solid phenoxide and considerable production of ethers are obtained by leaving the reactants in contact during the course of the reaction.

*Example III*

Using the technique of Example I, 3.0 grams (0.019 mole) of solid sodium o-allyl phenoxide was placed in the thimble of a Soxhlet extractor. Over the solid was percolated a solution of 8.0 g. (0.105 mole) of allyl chloride in about 120 ml. of n-pentane. The resulting pentane solution was then concentrated, treated with aqueous HCl and extracted with diethyl ether. The ether solution was dried over anhydrous magnesium sulfate, and the ether evaporated to yield 2.6 g. of liquid residue. Vapor phase chromatographic analysis of the allylated products gave the following analysis:

| Compound: | Percent wt. |
|---|---|
| Allyl 2-allylphenyl ether | 8 |
| 2,6-Diallyl phenol | 73 |
| Allyl 2,6-diallylphenyl ether | 19 |

Analysis of the residue in the thimble showed that only 2% of the sodium o-allyl phenoxide remained therein.

*Example IV*

A mixture of 3.0 g. (0.019 mole) of sodium o-allyl phenoxide, 8.0 g. allyl chloride and about 50 g. n-pentane were refluxed together. The mixture was cooled and the components determined as in Example II. It was found that only 26% of the sodium o-allyl phenoxide had been converted to other products. The analysis of these products by vapor phase chromatography gave the following data:

| Compound: | Percent wt. |
|---|---|
| Allyl 2-allylphenyl ether | 25 |
| 2,6-Diallyl phenol | 58 |
| Allyl phenyl ether | 17 |

*Example V*

When cinnamyl chloride in benzene solution is percolated through a solid bed of potassium phenoxide, using the method of Example I, 2-cinnamyl phenol is obtained in high yield.

*Example VI*

A solution of crotyl bromide in cyclohexane is percolated through solid p-cresol. The product 2-crotyl p-cresol is recovered from the solvent in high yield, practically free from crotyl cresyl ether.

I claim as my invention:

1. The Soxhlet-type continuous process of ortho-allylating a phenol by percolating a solution of $\beta,\gamma$-alkenyl halide, wherein the halogen is selected from the group consisting of chlorine and bromine, in a substantially anhydrous inert non-polar hydrocarbon solvent through a solid alkali metal salt of the phenol having the structure

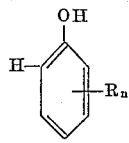

wherein R is non-acetylenic hydrocarbon of up to 8 carbon atoms and $n$ is a whole number from 0 to 4 inclusive, at a temperature from about 0° C. to about 100° C., separating by distillation from the resulting solution containing the corresponding ortho-$\beta,\gamma$-alkenyl phenyl unreacted $\beta,\gamma$-alkenyl halide together with solvent and recycling the distillate for re-percolation through the unreacted solid alkali metal salt of said phenol until substantially all of said alkali metal salt of said phenol is converted.

2. The Soxhlet-type continuous process of ortho-allylating phenol by percolating a solution of allyl halide, wherein the halogen is selected from the group consisting of chlorine and bromine, in a substantially anhydrous inert non-polar hydrocarbon solvent through solid alkali metal phenoxide at a temperature from about 0° C. to about 100° C., separating by distillation from the resulting solution containing an ortho-allyl phenol unreacted allyl halide together with solvent and recycling the distillate for re-percolation through the unreacted solid alkali metal phenoxide until substantially all of said alkali metal phenoxide is converted.

3. The process of claim 2 wherein the solvent is a paraffin of from 5 to 10 carbon atoms.

4. The Soxhlet-type continuous process of ortho-allylating a phenol by percolating a solution of $\beta,\gamma$-alkenyl halide, wherein the halogen is selected from the group consisting of chlorine and bromine, in a substantially anhydrous inert non-polar hydrocarbon solvent through a solid alkali metal salt of the phenol having the formula

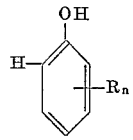

where R is $\beta,\gamma$-alkenyl of up to 8 carbon atoms and $n$ is a whole number from 1 to 4 inclusive, at a temperature of from about 0° C. to about 100° C., separating by distillation from the resulting solution containing the corresponding poly($\beta,\gamma$-alkenyl) phenol unreacted $\beta,\gamma$-alkenyl halide together with solvent and recycling the distillate for re-percolation through the unreacted solid alkali metal salt of said phenol until substantially all of said alkali metal salt of said phenol is converted.

5. The Soxhlet-type continuous process of ortho-allylating allyl phenol by percolating a solution of allyl halide, wherein the halogen is selected from the group consisting of chlorine and bromine, in a substantially anhydrous paraffin of from 5 to 10 carbon atoms through solid alkali metal allyl phenoxide at a temperature of from about 0° C. to about 100° C., separating by distillation from the resulting solution containing diallyl phenol unreacted allyl halide together with solvent and recycling the distillate for repercolation through the unreacted solid alkali metal allyl phenoxide until substantially all of said phenoxide is converted.

6. The Soxhlet-type continuous process of ortho-allylating phenol by percolating a solution of allyl chloride in a substantially anhydrous inert non-polar hydrocarbon solvent through solid sodium phenoxide at a temperature of from about 0° C. to about 100° C., separating by distillation from the resulting solution containing ortho-allyl phenol unreacted allyl chloride together with solvent and recycling the distillate for re-percolation through the unreacted solid sodium phenoxide until substantially all of said phenoxide is converted.

7. The Soxhlet-type continuous process of ortho-allylating a phenol by percolating a solution of allyl chloride in a substantially anhydrous inert non-polar hydrocarbon solvent through solid sodium ortho-allyl phenoxide at a temperature from about 0° C. to about 100° C., separating by distillation from the resulting solution containing the corresponding di-ortho-allyl phenol unreacted allyl chloride together with solvent and recycling the distillate for repercolation through the unreacted solid sodium ortho-allyl phenoxide until substantially all of said phenoxide is converted.

References Cited by the Examiner

UNITED STATES PATENTS 2,968,679   1/61   Aelony _____ 260—624

OTHER REFERENCES

Kornblum et al.: Jour. Amer. Chem. Soc., 81: 2705–2715 (1959).

LEON ZITVER, *Primary Examiner.*